United States Patent [19]

Sarlo

[11] 3,772,658

[45] Nov. 13, 1973

[54] ELECTRONIC MEMORY HAVING A PAGE SWAPPING CAPABILITY

[75] Inventor: Lorenz M. Sarlo, Matawan, N.J.

[73] Assignee: The United States of America as represented by the Secretary of the Army, Washington, D.C.

[22] Filed: Feb. 5, 1971

[21] Appl. No.: 112,903

[52] U.S. Cl. ............. 340/173 R, 307/238, 307/279, 340/173 RC, 340/174 SR

[51] Int. Cl. ............................................ G11c 19/00

[58] Field of Search ............................ 307/221, 238; 340/173 SR, 173 FF, 173 RC, 174 SR

[56] References Cited

UNITED STATES PATENTS

| | | | |
|---|---|---|---|
| 3,440,444 | 4/1969 | Rapp | 340/173 FF |
| 2,958,075 | 10/1960 | Torrey | 340/174 SR |
| 3,003,141 | 10/1961 | Myers | 340/174 SR |
| 3,114,137 | 12/1963 | Morgan | 340/174 SR |

OTHER PUBLICATIONS

RCA Technical Note No. 654, November 1965.

IBM Technical Disclosure Bulletin Vol. 13, No. 1, June 1970, Pages 267 & 268.

IBM Technical Disclosure Bulletin Vol. 13, No. 7, December 1970, Page 1819.

IBM Technical Disclosure Bulletin Vol. 13, No. 7, December 1970, Page 1879.

IBM Technical Disclosure Bulletin Vol. 11, No. 1, June 1968, Pages 12–13a.

*Primary Examiner*—Terrell W. Fears

*Attorney*—Harry M. Saragovitz, Edward J. Kelly, Herbert Berl and Jeremiah G. Murray

[57] ABSTRACT

An electronic memory having a data register, an address register and an array of storage cells. Each cell includes a plurality of two-state devices. The data register is connected to one of the two-state devices in each storage cell for communication therewith. The two-state devices in each storage cell are connected in a ring so that the bits stored therein may be shifted around the ring. The address register includes a line or word address portion. The line address portion selects the group or line of storage cells which are to communicate with the data register. The page address portion selects which of the two-state devices contains the information to be either sensed or changed by the data register and shifts this information to the one two-state device in each storage cell which is connected to the data register.

1 Claim, 2 Drawing Figures

INVENTOR.
LORENZ M. SARLO
BY: Jeremiah J. Murray AGENT
Harry M. Saragovitz, Edward J. Kelly & Herbert Berl
ATTORNEYS.

INVENTOR.
LORENZ M. SARLO

BY: [signature] AGENT
[signatures]
ATTORNEYS.

ELECTRONIC MEMORY HAVING A PAGE SWAPPING CAPABILITY

The present invention relates to electronic data storage systems and more particularly to an electronic memory having a page swapping capability.

In electronic digital computer systems which feature a multiprogramming capability, there exists a requirement to store several independent program units or segments in main memory simultaneously. These segments are typically sub-divided into pages (typically about 2,000 words) and may or may not be part of the same overall program. The multiprogramming capability demands that the computer's executive allocate processing time slices to the several groups of pages which constitute the active task based upon some priority algorithm. Prior art systems usually consist of several modules of word random access core, used as a main frame memory of typically 4K, 8K or 16K words per module, backed up with a disk or drum, used as a swap memory with typically 100K or more words of storage, which together form a virtual working store. The addressing scheme is then designed to make the swap memory appear simply as an extension of main frame memory.

In order for such a system and in general any time sharing system to operate efficiently the amount of time lost by virtue of processor idle time required to switch from one group of pages to some other must be minimized.

Usually when the slice time of the task is exhausted, no idle time occurs if the new task's pages are already in main memory. If these pages are not present, an interrupt must be initiated and the wanted page group must be located and brought into main frame memory from the swap memory or from mass storage. At this point, the processor may go on to some other task already in main memory. If that memory module is tied up by an input-output unit or by swap memory, the processor remains idle until some other tasks can be found.

The time required to bring pages in from mass storage appears unavoidable. High speed, high transfer rate storage devices have been designed to ease this problem. Also, statistics recently obtained on prior art systems indicate that tasks generally tend to require a large number of pages in main memory, i.e. that page accessing over a short time slice, say 5K to 10K instructions, ranges quite widely requiring much swapping of pages. It becomes evident that time is required to build up sufficient pages so that the processor can run effeciently and thereby minimize the number of interrupts which cause the task to lose control of the processor. However, during this swapping time that particular module is blocked from access by the processor. Since main memory space is limited, a point can be reached where more time is spent in swapping pages than in actual execution of programs.

In accordance with the principles of the present invention, the time required for swapping pages between main memory and swap memory is reduced considerably. To attain this time reduction, the present invention contemplates a unique main memory having a page swapping capability.

It is therefore a primary object of the present invention to provide a combined memory having the capability of functioning as both a main memory and a page swapping memory.

Another object is the provision of a memory having a page swapping capability with a relatively short swap time.

A further object of the invention is the provision of a relatively simple memory having the combined function of a main memory and a page swap memory.

With these and other objects in view, as will hereinafter more fully appear, and which will be more particularly pointed out in the appended claims, reference is now made to the following description taken in connection with the accompanying drawings in which:

Figure 1:
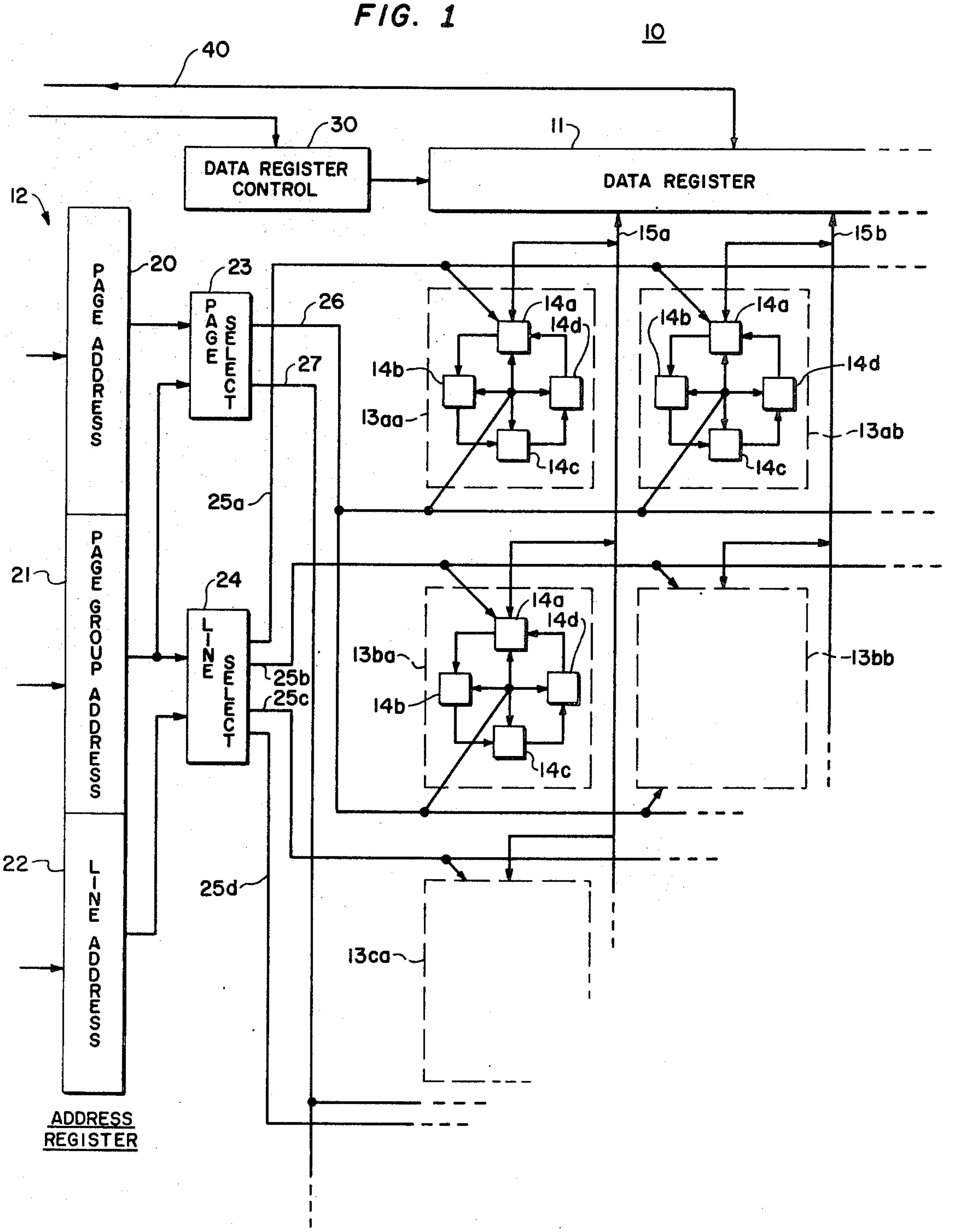
FIG. 1 shows a block diagram of a preferred embodiment of the invention.

Referring now to the drawing, there is shown in FIG. 1 an electronic memory 10 having a data register 11, an address register 12 and an array of identical storage elements **13*aa*, 13*ab*, etc. each of which includes a plurality of two-state devices 14*a*, 14*b*, 14*c* and 14*d***.

The data register 11 has a plurality of input-output buses **15*a*, 15*b*, etc. T8e input-output bus 15*a* is connected to the first stage of the data register 11 and to the two-state device 14*a* of each of the storage elements in the first column of the array, i.e. elements 13*aa*, 13*ba*, 13*ca*, etc. Likewise, bus 15*b* is connected to the storage elements of the second column, i.e. 13*ab*, 13*bb***, etc.

The address register 12 is separated into three sections; the page address section 20, the page group address section 21, and the line address section 22. Outputs from these sections are connected to a page select decoder 23 and a line select decoder 24.

Outputs **25*a*, 25*b*, 25*c* and 25*d* from the line select decoder 24 are each connected to the two-state devices 14*a* in each of the storage elements 13 of a different row. For example, the output 25*a* is connected to each of the storage elements in the top row of the array, i.e. elements 13*aa*, 13*ab***, etc.

Page select decoder 23 has a plurality of outputs 26 and 27 each of which is connected to all of the two-state devices **14*a*–14*d* in all of the storage devices 13 of a different group of rows. For example, the output 26 of page select decoder 23 is connected to all of the storage devices 13 in the first two rows of the array, i.e. 13*aa*, 13*ab*, etc. and 13*ba*, 13*bb*, etc. to form a first group of rows. The output 27** is connected to a second group of rows in the array.

The two-state devices **14*a*, 14*b*, 14*c* and 14*d* in each storage device 13 are connected in a ring, i.e. device 14*a* is connected to device 14*b* which is connected to device 14*c*, which in turn is connected to 14*d* which is finally connected back to device 14*a***.

Typically, the data register 11 includes an assembly of bistable circuits and related elements for temporarily holding binary data which is to be either written into or read from the storage devices 13 of a particular row. A data register control 30 tells the data register 11 whether to write or read, i.e. whether to drive or sense buses **15*a*, 15*b*, etc. When writing information, the data register obtains the information from other portions of the computer system via the input-output line 40. When reading information, buses 15*a*, 15*b*, etc. are sensed by register 11 and an output is provided via line 40** to the appropriate portion of the computer. Data registers are basically well known and a more detailed description will not be given here.

Similarly, the address register 12 is an assembly of bistable circuits which temporarily hold the address of a memory location. The address of a memory location in the present array consists of three parts. The first part selects the page, the second part selects the page group, and the third part selects the line.

The page group portion of the address refers to a particular group of rows of storage elements 13 in the array. For example, here in FIG. 1, one page group consists of the two top rows and the other page group may consist of the next two rows. In an actual memory there may be several hundred or thousand rows of storage devices 13, i.e., a whole memory module assigned to each page group and several hundred page groups in the entire memory system.

The page portion of the address refers to a particular one of the two-state devices 14 in each of the storage devices 13. Since there are only four two-state devices 14 in each storage device 13 in FIG. 1, there are only four pages in any page group. All of the two-state devices 14*a* in the top two rows of the array hold information on a single page. Information contained in the two-state devices 14*b* of the top two rows of the array hold information common to another page of that group.

Lastly, the line portion of the address refers to the particular word select line of a particular page in a particular page group. For example, the storage devices 13 in the first or top row of the array make up the first line on each of the four pages in the first page group. Typically, each line of a memory array usually holds one binary word. For example, a binary word might consist of 36 bits all of which are stored in a single row of a memory array. In the present example, each row of the array actually holds four binary words, one bit in each of the two-state devices 14. Therefore, there would be 36 storage devices 13 in each of the rows of the array, if the standard binary word is a 36 bit word.

The function of the two-state devices 14*a*, 14*b*, 14*c* and 14*d* of the storage devices 13 and their interconnections will now be described. As mentioned earlier, the two-state devices 14*a*, 14*b*, 14*c* and 14*d* are interconnected in a ring so that information may be shifted from each two-state device to the next succeeding device when a proper shift signal is applied from the output of the page select decoder 23. For example, if a shift signal should appear on output line 26 of page select decoder 23, then the shift signal will be applid simultaneously to all of the two-state devices 14*a*, 14*b*, 14*c* and 14*d* of each of the storage devices 13 in the top two rows of the array. Therefore, the information will be shifted one step around the ring so that the information in devices 14*a*, 14*b*, 14*c* and 14*d* will simultaneously shift to devices 14*b*, 14*c*, 14*d* and 14*a* respectively.

Information is read out of or written into a storage device 13 via the two-state device 14*a* and the corresponding input-output bus 15*a* or 15*b*, etc. However, since only one line or row of the array can be accessed by the data register at a time, information cannot be passed to or from devices 14*a* to the buses 15*a*, 15*b*, etc. unless a pulse also appears on one of the corresponding outputs 25*a*–25*d* of line select decoder 24

Therefore, in effect, the array consists of a plurality of rows of storage devices 13 with each row corresponding to a different line address. The computer may access a particular line in the memory for the purpose of reading or writing information therein by first inserting an address in register 12 and then accessing the data register 11 via line 40 and data register control 30. The address register 12 will activate one of the lines 25*a*–25*d* which will make a particular line or row of the array available for access to the data register 11 via buses 15*a*, 15*b*, etc.

As pointed out earlier, a particular program, or independent program segment is typically subdivided into page groups which are operated on for a given time slice after which a different group of pages is made available by swapping. In the present system the working memory which constitutes the active task, consists of the information contained in the two-state devices 14*a*. The information contained in the other two-state devices 14*b*, 14*c* and 14d may be considered to be in the swap memory. Those pages in swap memory which are to be made available for access, i.e. to be made part of the working memory are shifted to the two-state devices 14*a* by simply pulsing the appropriate lines 26 and/or 27, either one, two, or three times. Therefore, all of the bits or words on a particular page are brought into the active memory simultaneously. The number of time periods required to bring a page into the working memory will depend on the number of pages in the page groups, i.e., the number of two-state devices 14, and how far from the working memory (two state devices 14*a*) the information is stored, i.e., which one of the two-state devices 14 contain the page.

The particular construction of the array becomes uniquely useful when constructed from active integrated circuits. MOS integrated chips have distinct advantages over more conventional memory elements. However, the number of external connections to a MOS integrated chip must be limited, if an economical and practical storage element is to be realized. The present system is easily constructed from MOS integrated chips having a limited number of external connections. The manner in which this is done will be shown in connection with the description of FIG. 2.

Figure 2:
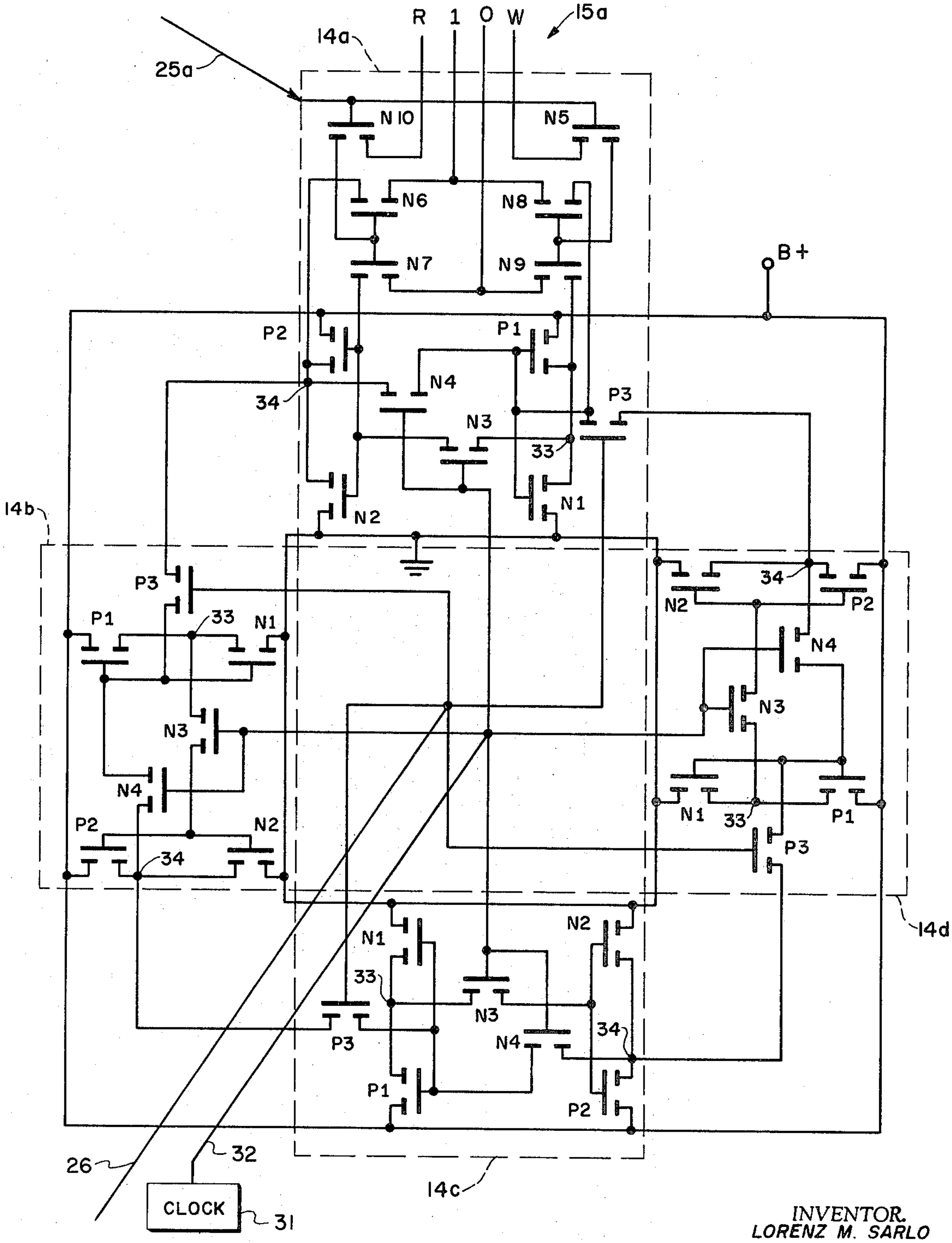
FIG. 2 is a circuit diagram of a portion of the device shown in FIG. 1.

FIG. 2 shows a circuit diagram of one of the storage devices 13, wherein all of the elements used to construct the two-state devices 14 can be constructed on a single MOS integrated chip. It will also be shown that the number of external connections from the chip is independent of the number of two-state devices 14 thereon.

In FIG. 2 is shown one of the storage devices 13*aa* with the two-state devices 14*a*, 14*b*, 14*c* and 14*d* shown in detail. The two-state devices 14*a*–14*d* are all basically the same with two-state device 14*a* having additional elements to provide access from outside the chip. Each of the two-state devices 14*a*–14*d* has p-type transistors P1, P2 and P3 and n-type transistors N1, N2, N3 and N4. In addition, two-state device 14*a* has n-type transistors N5–N10.

The interconnection between the MOS transistors will now be described in conjunction with a description of the operation. It will be assumed that the characteristics of the MOS transistors are well known and will therefore not be described in detail except to point out that a positive potential on the base of the transistors will turn the n-type on and will turn the p-type off. A negative or ground potential on the base will do the opposite, i.e., turn the p-type on and turn the n-type off. A MOS transistor is considered to be on when conducting and off when not conducting.

Line 25a is connected from the line select decoder 24 (FIG. 1) to the base of transistors N10 and N5. A positive pulse on line 25a will turn on transistors N5 and N10. Therefore, when information is to be read from or written into a particular two-state device 14a, that device is selected by first putting the proper addresses in sections 21 and 22 of the address register 12. These addresses are decoded by decoder 24 and a positive pulse is provided on one of the outputs 25a–25d.

The input-output bus 15a consists of four lines R, W, I and O. A positive pulse on either the R or W lines is provided by the data register 11 when information is to be either read from or written into the two-state device 14a. If the R line is positive, then the data register 11 will sense the potential on lines 1 and 0. A positive pulse will appear on only one of these lines, as will be shown later. A positive potential on the 1 line indicates that a logical 1 is stored in the storage device 13aa and a positive potential on the 0 line indicates that the device 13aa has a logical 0 stored therein.

When information is to be written into a two-state device 14a, the data register 11 provides a positive pulse on the W line and on either the 0 or 1 line depending on the information to be stored.

It is pointed out that the lines 25a, R, W, 1 and 0 are all external connections to the chip. The B+ terminal and the ground terminal are also externally connected to the chip. An external connection from the page select decoder 23 is also made to each chip. The line 26 and 27 are connected to the base of the transistor P3 in each of the two-state devices 14a–14d of the appropriate storage device 13. A clock 31 is connected via external connection 32 to the base of each of the transistors N3. The B+, ground, and the clock are not shown in FIG. 1 to simplify the drawing. Line 26 is used to shift the information in the two-state devices 14a–14d one step counterclockwise, i.e., the information in 14a is shifted to 14b, 14b to 14c, 14c to 14d, and 14d to 14a. The clock pulses are positive pulses which are used to insure that all operations are provided in step and at the right time.

The bases of transistors N1 and P1 are connected in common as is the bases of transistors N2 and P2. One side of transistors N1 and N2 are grounded and the other sides are connected to one side of transistors P1 and P2 respectively at points 33 and 34 respectively. The other side of P1 and P2 are connected to B+. The information is stored in the two-state devices 14a–14d as a potential on the points 33 and 34. The potentials on the points 33 and 34 depend on the potential of the bases of transistors P1 and N1, or P2 and N2. For example, if the bases of transistors N1 and P1 are made positive then P1 is turned off, N1 is turned on and point 33 is grounded via transistor N1. If the bases of transistor P1 and N1 are grounded, then the point 33 will go positive to B+ via transistor P1. It is also noted that point 33 at equilibrium will always assume the potential which is opposite to the potential on the bases of transistors P1 and N1.

The same analysis may be made for the point 34 and the transistors N2 and P2. The relationship between the points 33 and 34 is established when the clock 31 provides a positive clock pulse on line 32 thereby turning on the transistors N3 and N4. The points 33 and 34 will have opposite potentials, since point 33 is coupled to the base of transistors N2 and P2 via transistor N3 and point 34 is coupled to the base of transistors N1 and P1 via transistor N4.

Each of the memory functions of the storage cell 13 will now be described, i.e., read, write and shift (page swap). The shift or page swapping function will be described first. For this purpose assume that the two-state device 14a, 14b, 14c and 14d have stored therein the bits 1, 0, 1 and 0 respectively. A stored logical 1 is considered to be a positive potential stored on point 34. A stored logical 0 is a positive potential stored at point 33.

When sections 20 and 21 of the address register 12 is addressed with a particular page of a particular page group, the page select decoder 23 decodes the address and provides the proper output on one of the lines 26 or 27 to shift the information in the two-state devices 14a–14d around the ring until the desired page is in the working memory, i.e., two-state device 14a. If the page is stored in the two-state device 14a then no shift or page swapping is necessary and there is no output from page select decoder 23. However, if the addressed page is in the two-state device 14c, for example, then the information in devices 14c must be shifted from 14c through 14d to 14a. In this case the output on line 26 for example would be two negative pulses.

With the first negative pulse, transistors P3 will all be turned on and the bases of transistors P1 and N1 will all assume the potential of point 34 of the preceding two-state devices 14a–14d, and point 33 will then assume the inverse of point 34. In other words, since point 34 of two-state device 14d is at ground potential (a logical 0 is stored therein), then the bases of transistors P1 and N1 in devices 14a will be grounded via transistor P3 and point 33 will be made positive via transistor P1. The clock 31, immediately after the line 26 is grounded, will provide a positive pulse which will turn on transistors N3 and N4, thereby forcing points 34 to assume the inverse of point 33 which in turn was forced to be the inverse of point 34 in the preceding two-state devices 14a–14d. Therefore, after the clock pulse is removed, the information on point 34 in one two-state device 14 is now shifted to the next two-state device 14. With the arrival of the next shift pulse, the information is again shifted around the ring with the final result that the information i.e., the original state of point 34 in two-state devices 14c, is shifted to two-state device 14a, i.e., the final state of point 34 in two-state device 14a. This page swapping or shifting takes place simultaneously in all storage cells 13 of the group addressed.

The read operation is performed with a positive pulse on line R which in turn will cause one of the lines 1 or 0 to go-positive depending on the information stored in the two-state device 14a. If two-state device 14a contains a logical 1, i.e., point 34 is positive, then line 1 will go positive via transistor N6 which was turned on by the positive pulse from line R via transistor N10 which in turn was turned on by line 25a. Line 0 will have been driven to ground via transistor N7 and the base of transistors N2 and P2.

The write operation is initiated by a positive pulse on line W and a positive pulse on line 1 or 0. The positive pulse on line W turns on transistors N8 and N9 via transistor N5. A positive pulse on line 1 will force point 34 positive via transistors N8 and N4. A positive pulse on line 0 will force point 33 positive via transistor N9, thereby storing a logical 0 therein.

The particular circuit just described shows how the required page swapping functions may be readily accomplished with MOS integrated chips which have a minimum number of external connections. Also, the number of external connections is independent of the number of two-state devices on the chip. Various modifications are contemplated and may obviously be resorted to by those skilled in the art without departing from the spirit and scope of the invention, as hereinafter defined by the appended claims.

What is claimed is:

1. An electronic memory comprising:

an array of storage cells;

each said storage cell including a plurality of two-state device means each for storing a bit of digital data therein;

each said storage cell including an interconnecting means for connecting the output of each said two-state device means to the input of a different one of each said two-state device means to form a closed ring;

each said storage cell including an energizable shift means for shifting data between all said two-state device means around said closed ring via said interconnecting means;

one of said two-state device means in each said storage cell of said array including an energizable data input-output means;

data register means connected to each said storage cell via said energizable data input-output means for transmitting information between said data register means and said storage cells via a selected energized plurality of said energizable data input-output means;

address register means including a line select means and a page select means;

said line select means connected to each said storage cell for selectively energizing different pluralities of said energizable data input-output means depending on the address data stored in said address register; and said page select means connected to each said shift means for energizing said shift means to selectively shift data a variable number of steps around said closed ring depending on the address data stored in said address register.

* * * * *